United States Patent Office 3,362,969
Patented Jan. 9, 1968

3,362,969
PROCESS FOR THE PURIFICATION OF
ω-AMINOCARBOXYLIC ACIDS
Toyoji Tsuchihara, Tokyo, Japan, assignor to Showa
Denko Kabushiki Kaisha, Tokyo, Japan, a corporation of Japan
No Drawing. Filed Feb. 12, 1964, Ser. No. 344,206
Claims priority, application Japan, Feb. 14, 1963,
38/5,995
12 Claims. (Cl. 260—404)

ABSTRACT OF THE DISCLOSURE

A process for the purification of ω-aminocarboxylic acid which comprises steps of contacting a solid mixture of ω-aminocarboxylic acid and ammonium halide with a phenol to dissolve only said ω-aminocarboxylic acid into said phenol and separating this solution from said ammonium halide.

---

This invention relates to a process for the purification of a variety of ω-aminocarboxylic acid monomers or ω-aminocarboxylic acid monomer mixtures which are important as the starting materials for polyamides, medical drugs, other useful organic compounds, etc.

More particularly, this invention relates to a process for purifying ω-amino carboxylic acid which comprises separating ammonium halide from a mixture of at least one ω-aminocarboxylic acid and ammonium halide. When ω-aminocarboxylic acids are produced by reacting ammonia with ω-halogenocarboxylic acids, ammonium halide exists as a by-product in the resultant ω-aminocarboxylic acids. This invention presents a process for purifying ω-amino carboxylic acids which comprises contacting such a mixture of at least one ω-aminocarboxylic acid and ammonium halide with phenols to dissolve said ω-aminocarboxylic acids and separating the ammonium halide.

Further, this invention relates to a process for purifying ω-aminocarboxylic acids which comprises contacting a mixture of at least one ω-aminocarboxylic acid and ammonium halide with phenols diluted by an organic solvent that is chemically inert to ω-aminocarboxylic acid and does not dissolve ammonium halide thereby to dissolve said ω-aminocarboxylic acid and thus separating ammonium halide. Still further, this invention relates to a process for purifying ω-aminocarboxylic acids which comprises contacting a mixture of at least one ω-aminocarboxylic acid and ammonium halide with phenols or the phenols diluted by the aforementioned organic solvent thereby to dissolve said ω-aminocarboxylic acid, separating the ammonium halide, thereafter introducing said ω-aminocarboxylic acid solution which no longer contains ammonium halide into an organic medium that is chemically inert to ω-aminocarboxylic acid, does not dissolve ω-aminocarboxylic acid and is miscible with said phenols, and isolating said ω-aminocarboxylic acid.

Accordingly, an object of this invention is to present a process for purifying ω-aminocarboxylic acid thereby making it possible to separate easily and economically ammonium halide from the aforementioned ω-aminocarboxylic acid containing ammonium halide. Another object of this invention is to provide ω-aminocarboxylic acid which is pure enough to enable the production of polyamides having high polymerisation degree.

As an industrially available process employed heretofore in the synthesis of ω-aminocarboxylic acid, there is a method of ammonolysing ω-halogenocarboxylic acid to form a corresponding ω-aminocarboxylic acid. As to the case in which ω-halogenocarboxylic acid is ω-chlorocarboxylic acid, A. N. Nesmeyanov et al. describes in "Chem. Tech. (Berlin) 2, 139 (1957), that a telomer mixture obtained from ethylene and carbon tetrachloride is separated into each component by distillation and from each distillate is derived ω-aminocarboxylic acid by the following procedure.

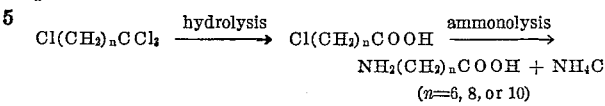

$$Cl(CH_2)_nCCl_3 \xrightarrow{\text{hydrolysis}} Cl(CH_2)_nCOOH \xrightarrow{\text{ammonolysis}} NH_2(CH_2)_nCOOH + NH_4Cl$$

($n$=6, 8, or 10)

In this case, ammonium chloride of equal mole results as by-product, which, according to them, is separated by means of an ion-exchange resin. As comparatively good yields are observed in each of the above steps, this process is promising as a method for the production of ω-aminocarboxylic acids. However, in industry the step to separate ammonium chloride from ω-aminocarboxylic acids poses the most difficult problem. When an ion-exchange resin is used, it is necessary to provide a great quantity of acid, alkali and ion-exchange water. In addition, this process possesses many defects such as the prolongation of time needed for the separation, complexities of the apparatus, growing expenses involved, and therefore this separating process is industrially disadvantageous. Further, in the process in which an ion-exchange resin is used, there is a disadvantage that the separation of ammonium chloride cannot be effected when the telomer mixture obtained by telomerisation is converted, without separating each telomer component, to mixed ω-aminocarboxylic acids.

On the other hand, a process for separating ω-aminocarboxylic acid from ammonium chloride by means of a common solvent reveals that it is no easy task to separate these from each other because both of them are electrolytes and thus have much the same solubility in common solvents. Moreover, in order to obtain the polyamides of high polymerisation degree as shown in Table 1 with respect to 7-aminoheptanoic acid, it is necessary that the amount of ammonium chloride present as an impurity should be very small, e.g., less than 0.5 mol percent. It is difficult, therefore, to separate these by means of any of the common solvents with good efficiency and industrial advantages. Hence, an ion-exchange resin has previously been used for the separating process.

TABLE 1.—POLYCONDENSATION OF 7-AMINOHEPTANOIC ACID IN THE PRESENCE OF AMMONIUM CHLORIDE
[Conditions: in a nitrogen gaseous stream; at an ordinary pressure; at 230° C; for 2 hours]

| Aminocarboxylic acid (mole) | Ammonium chloride (mole) | [1] Intrinsic viscosity of polyamides ($\eta$) |
|---|---|---|
| 1 | 1 | 0.039 |
| 1 | 0.5 | 0.044 |
| 1 | 0.1 | 0.096 |
| 1 | 0.05 | 0.157 |
| 1 | 0.01 | 0.330 |
| 1 | 0.005 | 0.547 |
| 1 | 0.001 | 0.547 |
| 1 | 0 | 0.553 |

[1] The intrinsic viscosity ($\eta$) is shown by the measurement carried out in m-cresol at 50°. (A 7-aminoheptanoic acid which gives polyamide having an intrinsic viscosity of 0.553, under polycondensation conditions mentioned above, is used as a reagent. This 7-aminoheptanoic acid and ammonium chloride are mixed with each other in proportions shown in the table.)

As a result of systematic researches of various solvents in an attempt to solve the pending problems of this separating method, I, the inventor, found that phenols having the general formula:

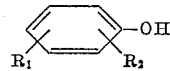

(where $R_1$, and $R_2$ represent the substituent selected from hydrogen, lower alkyl, phenyl and chloride) are good solvents for ω-aminocarboxylic acids and do not dissolve ammonium halide. Suitable phenols for the purpose are phenol (hydroxy benzene); alkyl phenols such as o-cresol, m-cresol, p-cresol, 2,3-xylenol, 2,4-xylenol, 2,6-xylenol, 3,4 - xylenol, 3,5-xylenol, o-ethylphenol, p-ethylphenol and thymol; phenyl phenols such as o-phenylphenol, m-phenylphenol and p-phenylphenol; and chlorophenols such as o-chlorophenol, m-chlorophenol, p-chlorophenol, 1,3 - dichlorophenol, 2,4-dichlorophenol and 3,5-dichlorophenol.

It has now been found that the use of the above-mentioned phenols gives very easy separation of ω-aminocarboxylic acids from ammonium halide; that the polycondensation of the purified ω-aminocarboxylic acids thus obtained forms polyamides of high polymerisation degree as in the case of aminocarboxylic acids obtained by ion-exchange resin purification; and, therefore, that this method of separation by a solvent is not only simple but also advantageous industrially as compared with the prior arts. The term "polyamide of high polymerisation degree," used herein, means a polyamide having an intrinsic viscosity of more than about 0.4 and preferably more than 0.6.

It is possible to use, in substitution for the above-listed phenols, the phenols diluted with an organic solvent chemically inert to ω-aminocarboxylic acids and does not dissolve ammonium halide. Such types of organic solvent can be easily and suitably selected by the art-skilled and so it would be unnecessary to give a long list of each compound in particular. As such organic solvents, there are used aliphatic hydrocarbons such as pentane, hexane and heptane; lower aliphatic ethers such as ethyl ether; lower aliphatic ketones such as acetone; aliphatic alcohols having more than 1 carbon atom such as ethanol, propanol and butanol; and aromatic hydrocarbons such as benzene and toluene. However, the above-mentioned organic solvents to be used in this invention are in no way limited to these compounds. When it is necessary to separate said organic solvent from ω-aminocarboxylic acids after ammonium halide has been separated by the process of this invention, the organic solvent should preferably be volatile.

Now the explanation is directed to the general method of separation in accordance with the present invention. A mixture of equal mole of ω-aminocarboxylic acids and ammonium halide is dissolved at a suitable temperature ranging from room temperature to 100° C. in phenols alone or in phenols diluted with said organic solvent which is miscible with phenols, chemically inert to ω-aminocarboxylic acids and does not dissolve ammonium halide, and the unsoluble ammonium halide is filtered off (if necessary, hot-filtered). Thereafter, by removal of the solvent under reduced pressure by evaporation, pure ω-aminocarboxylic acids can be obtained. Or, the filtrate is introduced dropwise, under stirring, into a medium (preferably a volatile medium), which is chemically inert to ω-aminocarboxylic acids and which does not dissolve ω-aminocarboxylic acids but dissolves phenols, to precipitate ω-carboxylic acids. It is preferable that the medium to be used in precipitating ω-aminocarboxylic acids should be the same with the solvent used in diluting the phenols—for instance, benzene in the case of phenol-benzene system— in consideration of its recovery. The filtrate, after the filtration of ω-aminocarboxylic acids, is deprived of the volatile medium by evaporation and the residual phenols can be used again.

In order to obtain polyamides, it is possible that solution polymerisation is effected just after the step of the filtration of ammonium halide without taking the trouble to isolate ω-aminocarboxylic acids as hereinabove mentioned. The resultant polyamide may be precipitated in a suitable medium such as water, alcohol, benzene, acetone, ether, etc.

When excess amount of phenols is used in this invention, they dissolve a small amount of ammonium halide which may come into the purified ω-aminocarboxylic acids; whereas too small an amount gives bad recovery of ω-aminocarboxylic acids. A suitable amount should therefore be used. In general, there is used 1 to 5 times by weight of the phenols against the aminocarboxylic acids.

In order to explain the effect of said separating method, some experiments in purification in which ω-aminocarboxylic acid is 7-aminoheptanoic acid, i.e., the case in which 7-aminoheptanoic acid contains equimolar ammonium chloride, are carried out, and the results shown in Table 2. (The dissolution temperature is 50° C.)

TABLE 2

| Amount of phenol used (weight ratio) (phenol/7-aminoheptanoic acid) | 7-aminoheptanoic acid recovery ratio (weight percent) | [1] Intrinsic viscosity of polyamide obtained from 7-aminoheptanoic acid purified by this separating method |
| --- | --- | --- |
| 1 | 90.2 | 1.12 |
| 2 | 97.6 | 1.12 |
| 3 | 98.5 | 0.80 |

[1] The polymerisation conditions are the same as in Table 1. The intrinsic viscosity of the polyamide obtained by the polycondensation, under same conditions, of 7-aminoheptanoic acid purified by a cation-exchange resin (AMBERLITE IR 120) was 1.01.

As shown in Table 2, it is most suitable that the proportion of phenol to 7-aminoheptanoic acid should be about 2:1.

When the diluted phenols are used, there is an advantage, as compared with the case in which phenols are used alone, that the viscosity of the solution is decreased thereby to give easy filtration. However, in this case, the amount of a diluent to be added to the phenols are restricted to some suitable range. Too much addition of the diluent causes the decrease of the solubility of ω-aminocarboxylic acids, and therefore a larger amount of diluted phenols becomes necessary. Usually, about 1/2 by weight of a diluent is used against the phenols.

A mixture in equal mole of 7-aminoheptanoic acid and ammonium chloride is purified at 50° C. with the aid of a phenol-benzene system solvent. The ratio of recovery in this case of 7-aminoheptanoic acid is shown in Table 3.

TABLE 3

[Phenol: 7-aminoheptanoic acid=2:1 (by weight)]

| Phenol:Benzene (weight ratio) | 7-aminoheptanoic acid recovery ratio (weight %) |
| --- | --- |
| Phenol alone | 97.6 |
| 2:1 | 95.2 |
| 2:2 | 75.7 |

(The conditions are the same as shown in Table 1.)

As can be observed from Table 3, the addition of benzene to phenol in about the same proportion by weight decreases considerably the recovery ratio of ω-aminoheptanoic acid.

Lower dissolution temperature is preferable, but in practice the temperature usually ranges from 20 to 80° C. in consideration of the ease of filtration. When the temperature rises above 100° C., ammonium halide begins to be dissolved in the phenol and so the purity of the separated ω-aminocarboxylic acid is deteriorated; hence the viscosity of the polyamide obtained by polycondensation thereof is lowered.

A mixture of equal mole of 7-aminoheptanoic acid and ammonium chloride was separated by means of phenol. The influences of the dissolution temperature are shown in Table 4.

TABLE 4

| Amount of phenol used (weight ratio) (phenol/ 7-aminoheptanoic acid) | Dissolution temperature (° C.) | Intrinsic viscosity of polyamide obtained by polymerization of 7-aminoheptanoic acid resulted from the separation method of this invention |
|---|---|---|
| 1 | 100 | 0.258 |
| 2 | 100 | 0.259 |
| 2 | 50 | 1.120 |
| 3 | 50 | 0.801 |

(The conditions are the same as in Table 1.)

| Ex. | Phenols | | Diluent | | Dissolution temperature (° C.) | Intrinsic viscosity of the polyamide obtained by polymerization of 7-aminocarboxylic acid resulted from the separation method of this invention |
|---|---|---|---|---|---|---|
| | Type | Amount used Weight ratio (phenol/7-amino-carboxylicacid) | Type | Amount used Weight ratio (diluent/phenols) | | |
| 2 | m-Cresol | 2 | | | 50 | 1.25 |
| 3 | 2,4-xylenol | 3 | | | 50 | 1.15 |
| 4 | 3,5-xylenol | 2 | | | 80 | 1.04 |
| 5 | o-chlorophenol | 4 | | | 80 | 0.77 |
| 6 | p-chlorophenol | 4 | | | 80 | 0.80 |
| 7 | Thymol | 4 | | | 80 | 1.19 |
| 8 | o-phenyl phenol | 4 | | | 80 | 1.12 |
| 9 | Phenol (hydroxybenzene) | 2 | Benzene | ½ | 50 | 1.12 |
| 10 | m-Cresol | 2 | Acetone | ½ | 50 | 1.21 |

As shown in Table 4, even if three times by weight of phenol is used, the viscosity of the polyamide obtained by polymerisation of 7-aminoheptanoic acid does not decrease so long as the dissolution temperature is 50° C. But when the dissolution is effected at a temperature of 100° C., even the use of the same amount by weight of phenol results in the increase in the solubility of ammonium chloride in phenol, thereby markedly preventing the polycondensation of 7-aminoheptanoic acid obtained.

Hereinabove, 7-aminoheptanoic acid has been taken up as an example for the sake of the explanation of the effects of the separation by solvent in accordance with this invention.

The process for separation of this invention is especially useful when applied to ω-aminocarboxylic acids of the general formula, $H_2N(CH_2)_nCOOH$ (wherein $n$ is an integer from 5 to 12).

In the case of ω-aminocarboxylic acid having more than 14 carbon atoms, there is a considerably large difference in solubility towards the common solvents such as alcohol between ammonium halide and the ω-aminocarboxylic acids. Therefore, the separation of these from each other is easily done by the methods other than that of this invention. Also, as ω-aminocarboxylic acid having less than 4 carbon atoms exhibits bad solubility in phenols, the practice of this invention becomes difficult.

In the following, the embodiments of this invention will be explained by examples.

EXAMPLE 1

A mixture of 5.00 g. of 7-aminoheptanoic acid obtained by ammonolysis of 7-chloroheptanoic acid and 1.85 g. of ammonium chloride (the molar ratio of this mixture being 1:1) is added to 10 g. of phenol (hydroxybenzene) whose temperature is maintained at 50° C. and stirred. Presently, the said amino acid is dissolved while the ammonium chloride remains undissolved. The undissolved ammonium chloride is hot-filtered at a temperature of 50° C. and the filtrate is put dropwise in 100 cc. benzene under stirring. The precipitated 7-aminoheptanoic acid is filtered and dried under a reduced pressure. The resultant 7-heptanoic acid weighs 4.88 g. and the recovery ratio is 97.6%. The melting point thereof is from 190 to 191° C.

The said 7-aminoheptanoic acid is polycondensed in a thermostat at a temperature of 230° C. for 2 hours under ordinary pressure while a nitrogen gas is being passed therethrough to form a polyamide having an intrinsic viscosity of 1.12.

EXAMPLES 2–10

With the use of various phenols singly or diluted by a diluent, the procedure of Example 1 is repeated. The results are shown in the table below. The recovery of ratio of the amino acid is more than 95% in every case.

EXAMPLE 11

A mixture of 1.50 g. of 7-aminoheptanoic acid and 0.55 g. of ammonium chloride is added to 3 g. phenol (hydroxybenzene) diluted with 1.5 g. of benzene, and heated to a temperature of 50° C. The undissolved ammonium chloride is hot filtered at a temperature of 50° C. with subsequent removal of the solvent in the filtrate while a nitrogen gas is being passed therethrough. The residual 7-aminoheptanoic acid is polycondensed at a temperature of 230° C. for 2 hours while introducing a nitrogen gas thereinto. The obtained polyamide weighs 1.21 g. and the intrinsic viscosity thereof is 1.23.

EXAMPLE 12

A mixture of 1.50 g. 7-aminoheptanoic acid and 0.55 g. ammonium chloride is put in a solution of 3 g. phenol (hydroxybenzene) diluted with 2 g. benzene, and heated to a temperature of 50° C., with subsequent filtration of ammonium chloride. The filtrate is heated to a temperature of 230° C. in a nitrogen substituted autoclave and maintained at this temperature for 5 hours. After cooling it to room temperature, the content of the autoclave is put into 500 cc. acetone to deposit a polyamide of an intrinsic viscosity of 0.65.

EXAMPLE 13

A mixture of 5.00 g. 9-aminononanoic acid obtained by ammonolysis of 9-chlorononanoic acid and 1.52 g. ammonium chloride (molar ratio being 1:1) is separated with the use of 10 g. phenol (hydroxybenzene) by the same procedure as in Example 1 to form 4.82 g. 9-aminononanoic acid whose melting point is 187–188° C. The polycondensation thereof gives a polyamide having an intrinsic viscosity of 1.18.

EXAMPLE 14

A mixture of 5.00 g. 7-aminoheptanoic acid obtained by ammonolysis 7-bromoheptanoic acid and 3.20 g. ammonium bromide (molar ratio being 1:1) is separated with the use of phenol (hydroxybenzene) by the same procedure as in Example 1 to form 4.63 g. 7-aminoheptanoic acid. The polycondensation thereof gives a polyamide having an intrinsic viscosity of 1.20.

EXAMPLE 15

An α,α,α,ω-tetrachloro alkane mixture obtained by telomerisation reaction of carbon tetrachloride and ethylene is deprived by distillation of 1,1,1,3-tetrachloropropane and 1,1,1,5-tetrachloropentane. The residual mixture is derived into ω-amino acid mixture after subjecting it to hydrolysis and thereafter ammonolysis. This ω-amino acid mixture (31.0 g.), which is found upon analysis to contain 11.4 g. 7-aminoheptanoic acid, 6.7 g. 9-aminononanoic acid, 5.2 g. 11-aminoundecanoic acid and 7.7 g. ammonium chloride, is put into 33.9 g. of phenol (hydroxybenzene) diluted with 22.6 g. of benzene, and heated to a temperature of 50° C. After filtration of the unsoluble ammonium chloride, the filtrate is poured under stirring in 300 cc. acetone whose temperature is maintained at 0° C. to precipitate mixture of amino acids which is in the form of powder. This is filtered and dried, after washing, under a reduced pressure to form 19.1 g. amino acid mixture. The recovery ratio is 82%.

After decolourisation of this amino acid mixture by an activated carbon, polycondensation is effected in nitrogen to give a transparent copolymer. This copolymer has a melting point of 151.9° C. and an intrinsic viscosity of 0.693.

EXAMPLE 16

A raw ω-amino acid mixture (31.4 g.) consisting of 14.9 g. of 7-aminoheptanoic acid, 8.4 g. of 9-aminononanoic acid and 8.1 g. of ammonium chloride is put a mixture of 34.2 g. of phenol (hydroxybenzene) and 22.8 g. of benzene heated to a temperature of 50° C., and stirred. After the filtration of the unsoluble ammonium chloride, the filtrate is poured in acetone whose temperature is maintained at 0° C. while stirring to form 19.2 g. powdery amino acid mixture. The recovery ratio is 82.5%. This powdery amino acid mixture has such a purity as makes it suitable for use in copolymerisation without further treatment.

EXAMPLE 17

A mixture consisting of 13.6 g. of 7-aminoheptanoic acid, 3.1 g. of 9-aminononanoic acid, 2.6 g. of 11-aminoundecanoic acid and 6.9 g. of ammonium chloride is added to a mixture solution of 24.9 g. of phenol (hydroxybenzene) with 16.6 g. of benzene and heated to a temperature of 50° C. After filtration of the unsoluble ammonium chloride the filtrate is poured, with stirring, into acetone cooled to a temperature of 0° C. to form 16.4 g. powdery amino acid mixture. The recovery ratio is 84.8%.

What is claimed is:

1. A process for the purification of ω-aminocarboxylic acids which comprises contacting a mixture of at least one ω-aminocarboxylic acid and ammonium halide, said ω-aminocarboxylic acid being represented by the general formula:

$$H_2N(CH_2)_nCOOH$$

wherein $n$ is an integer from 5 to 12 with a phenol of the general formula:

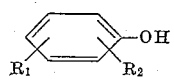

wherein $R_1$, $R_2$ are the substituents selected from hydrogen, lower alkyl, phenyl, and chlorine thereby to dissolve the said ω-aminocarboxylic acid(s) and thereafter separating ammonium halide.

2. A process according to claim 1 wherein the phenol to be used is diluted with an organic solvent which is chemically inert to ω-aminocarboxylic acid and does not dissolve ammonium halide.

3. A process according to claim 1 wherein the phenol is hydroxybenzene.

4. A process according to claim 2 wherein the phenol is hydroxybenzene.

5. A process according to claim 1 wherein the ω-aminocarboxylic acid is 7-aminoheptanoic acid.

6. A process according to claim 2 wherein the ω-aminocarboxylic acid is 7-aminoheptanoic acid.

7. A process according to claim 1 wherein the ω-aminocarboxylic acids are a mixture of 7-aminoheptanoic acid and 9-aminononanoic acid.

8. A process according to claim 2 wherein the ω-aminocarboxylic acids are a mixture of 7-aminoheptanoic acid and 9-aminononanoic acid.

9. A process according to claim 1 wherein the ω-aminocarboxylic acids are a mixture of 7-aminoheptanoic acid, 9-aminononanoic acid and 11-aminoundecanoic acid.

10. A process according to claim 2 wherein the ω-aminocarboxylic acids are a mixture of 7-aminoheptanoic acid, 9-aminononanoic acid and 11-aminoundecanoic acid.

11. A process for the purification of ω-aminocarboxylic acids which comprises contacting a mixture of at least one ω-aminocarboxylic acid and ammonium halide, said ω-aminocarboxylic acid being represented by the general formula:

$$H_2N(CH_2)_nCOOH$$

wherein $n$ is an integer from 5 to 12 with phenols of the general formula:

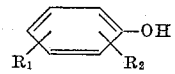

wherein $R_1$, $R_2$ are the substituents selected from hydrogen, lower alkyl, phenyl and chlorine thereby to dissolve the said ω-aminocarboxylic acid(s), separating ammonium halide, introducing the said ω-aminocarboxylic acid(s) solution which no longer contains ammonium halide into an organic medium which is chemically inert to ω-aminocarboxylic acid, does not dissolve ω-aminocarboxylic acid and miscible with the said phenol and thereafter isolating the said ω-aminocarboxylic acid(s).

12. A process according to claim 11 wherein the phenol to be used is diluted with an organic solvent which is chemically inert to ω-aminocarboxylic acid and does not dissolve ammonium halide.

References Cited

UNITED STATES PATENTS 2,471,053  5/1949  Almquist et al. _____ 260—529

ALEX MAZEL, *Primary Examiner.*

NICHOLAS S. RIZZO, *Examiner.*

F. A. MIKA, *Assistant Examiner.*